Nov. 11, 1969  G. A. MAAG  3,477,571

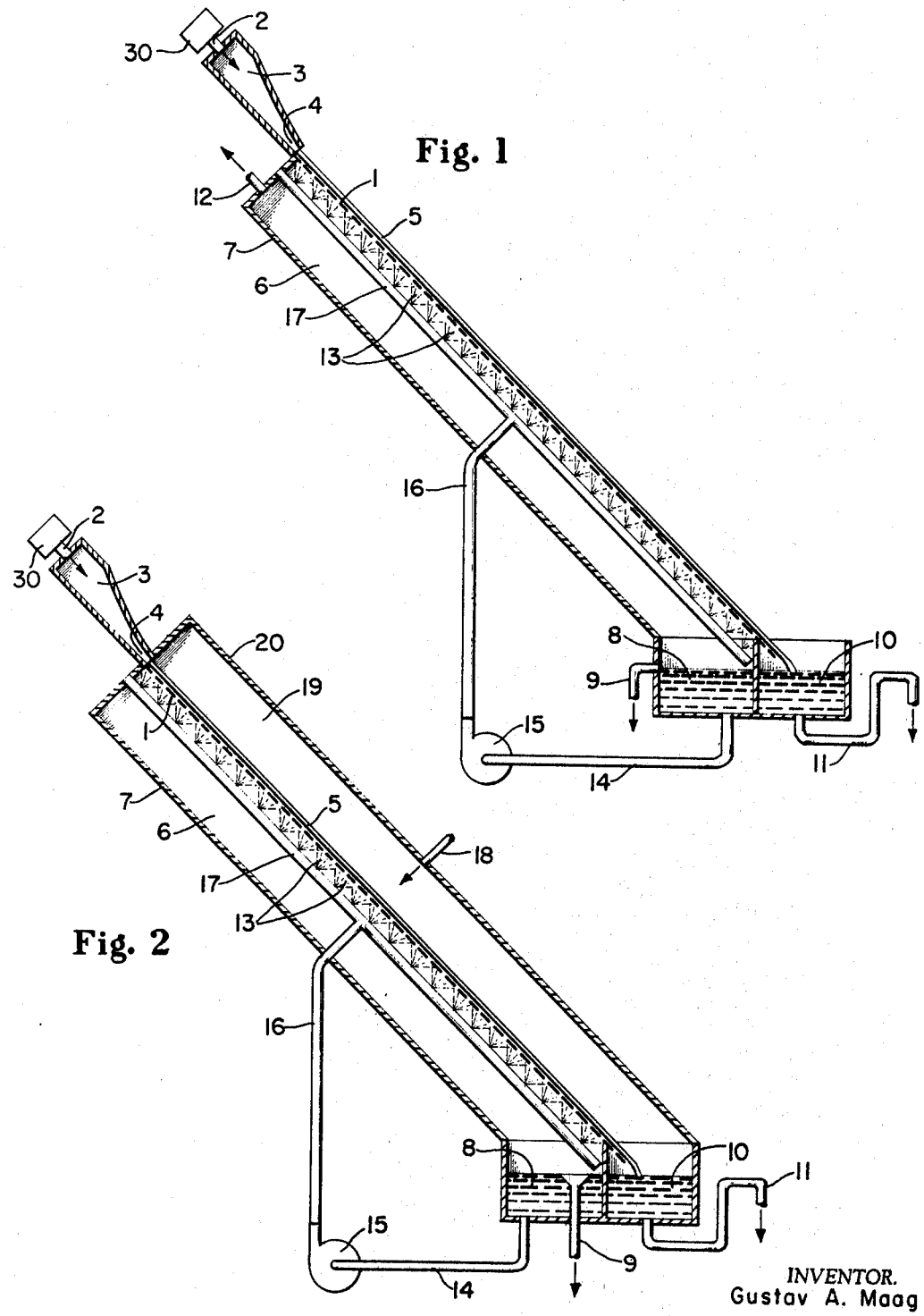

APPARATUS AND METHOD FOR SCREENING FIBROUS SLURRIES

Filed Nov. 14, 1966  2 Sheets-Sheet 2

INVENTOR.
Gustav A. Maag
BY
ATTORNEY

United States Patent Office 3,477,571
Patented Nov. 11, 1969

3,477,571
APPARATUS AND METHOD FOR SCREENING FIBROUS SLURRIES
Gustav A. Maag, Fort Wright, Ky., assignor to The Procter & Gamble Company, Cincinnati, Ohio, a corporation of Ohio
Filed Nov. 14, 1966, Ser. No. 594,017
Int. Cl. B03b 11/00
U.S. Cl. 209—250                                    5 Claims

ABSTRACT OF THE DISCLOSURE

A screening apparatus and method for the reclamation and classification of fibrous slurries, which screening apparatus is provided with a nozzle orifice for projecting a fibrous slurry downwardly over a screening surface disposed at an angle of about 0 degrees to about 60 degrees with the vertical. The screening apparatus can be provided with a woven wire screening surface, but preferably the screening surface is a thin perforated metal plate having a multiplicity of holes with diameters of about 0.005 inch to about 0.050 inch. Means for inducing a pressure differential through the screening surface independent of the slurry medium is provided.

---

This invention relates to apparatus and methods for use in the recovery and classification of fibers and other particulate materials existing in slurry suspensions. More particularly, the invention pertains to improved screening apparatus and methods for use in screening slurries for the purpose of reclaiming fibers and separating them from subfibrous particulate material, including very short fibers and fiber fragments.

Various problems, including screen blinding or plugging and low screen capacity, arise in the recovery and classification of fibers and other particulate matter existing in slurry form. In one such recovery and classification, namely the separation of fibers from white water in the manufacture of paper, high capacity and non-plugging screen characteristics are highly desirable due to the very large quantities of low fiber consistency material to be handled. In other screening applications associated with the manufacture of paper, for example in the separation of springwood and summerwood fibers, it is highly desirable to classify fibers according to their physical dimensions. In still other applications, for example de-inking and furnish preparation, it is desirable to wash papermaking fibers relatively free from undesirable fines which contribute decreased brightness, absorbency or other physical and chemical negatives to paper.

The term, "fibers," is used herein to designate relatively slender, rod-like, fibrous particles having a maximum dimension in excess of 0.5 mm. Irregular, chunky particles, including very short fibers and fiber particles, having a maximum dimension of 0.5 mm. or less are deisgnated as "fines." Furthermore, although the present screening apparatus can be employed in screening a variety of particulate slurry suspensions, wherein a woven wire screen is advantageous, the use of a relatively thin perforated metal plate as a screen has been found to be particularly advantageous in the recovery and classification of papermaking fibers. It is considered particularly desirable to use such a perforated metal plate where the perforations or holes in the plate are relieved, or larger in diameter, on the effluent side of the perforated plate. Accordingly the term, "screen," as used herein will be understood to include a screen consisting of a relatively thin metal plate having a multiplicity of perforations therein, which perforations are desirably relieved.

Experience has shown that the inclined screens, centrifugal screens and other devices conventionally employed in papermaking do not provide the combination of high capacity and fiber classification exhibited by the screening apparatus of the present invention. For example, when conventional inclined screening apparatus is equipped with screens having sufficiently small openings to collect fibers from white water, the screens plug readily. When the screen openings are enlarged to prevent plugging, the recovery of fibers is poor.

The screening apparatus disclosed herein has shown a continuous operating capacity for fibrous slurries, such as paper-making white water, of about five to about ten times that of a conventional inclined screen as disclosed for example in U.S. 2,039,573, issued to Don A. Weber on May 5, 1936, and U.S. 2,450,006, issued to Frank G. Lesniak on Sept. 28, 1948. In tests on such white water, containing approximately 0.1% of fibers and fines by weight, the screening apparatus of this invention has demonstrated the continuous recovery of up to about 97% of the fiber at rates of up to about 60 g.p.m. per square foot of screen area. This operating capacity was achieved without screen clogging and while maintaining the desired classification of fibers and fines.

Accordingly it is an object of this invention to provide improved screening apparatus and methods for use in recovering and classifying fibrous and particulate materials from slurry suspensions.

Yet another object of the invention is to provide methods by which desirable fibrous material in slurry suspension can be recovered and separated, or classified, from objectionable fines.

The nature and objectives of the invention can be summarized briefly as comprising screening apparatus and methods for recovering and classifying the fibers and fines in fibrous slurries. The recovery and classification of the fibers and fines is accomplished by projecting said slurries from an impetus producing nozzle downwardly over a screen surface while applying a pressure differential to urge said slurries through the screen. The nozzle feed results in an increased initial velocity and slurry flow over the screen surface to prevent plugging, while the capacity of the screen apparatus is increased by application of a pressure differential through the screen surface. The dual conditions of nozzle produced initial velocity and differential pressure also combine to result in increasing the capacity of the screen to separate and reclaim fibers from fines in fibrous slurries.

In its more important embodiments, the invention consists of screening apparatus and methods for the use of such screening apparatus wherein a screening surface is slanted at an angle of less than about 60 degrees with the vertical. Said screening surface is provided with means for projecting a fibrous slurry downwardly over said screening surface, means for inducing a pressure differential through said screening surface and means for collecting and maintaining the portion of the slurry passing through the screen separate from the portion flowing downwardly over the screen surface.

The fibers recovered by the present screening apparatus are suitable for use in papermaking and the clarified effluent passed through the screen, which effluent contains substantially all of the fines, can be used for shower water on papermaking felts and wires to conserve fresh water. It is also noted that the screening apparatus of this invention, particularly the preferred embodiments thereof in which a vertical cylindrical, perforated metal screen is employed, are advantageous in that their high throughput and the low floor space requirement achieve major savings in floor space and construction capital while effecting efficient fiber recovery and classification.

While the specification concludes with claims particularly pointing out and distinctly claiming the subject matter regarded as forming the present invention, it is believed that the invention will be better understood from the following description taken in connection with the accompanying drawings, wherein parts serving like functions are identified by like reference numbers.

FIGURE 1 is a side elevation cross section of a screening apparatus, using a flat screen, that can be employed in the practice of the invention.

FIGURE 2 is a side elevation cross section of another embodiment of screening apparatus using a flat screen in the practice of the invention.

Figure 3:
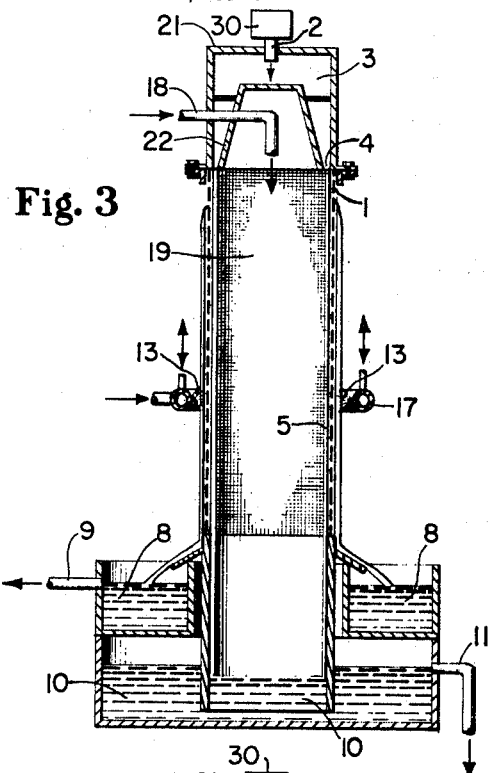
FIGURE 3 is an elevation cross section of an embodiment of the present screening apparatus using a vertical cylindrical screen.

Referring to FIGURE 1, the screen 1 is inclined at an angle of 45 degrees from the vertical for the purposes of illustration, although it can be inclined at an angle of 0 degrees to about 60 degrees, preferably 0 degrees to about 45 degrees, with the vertical. The slurry containing fibers and fines is introduced under pressure from pressure inducing means 30, for example a pump, through pipe 2 into chamber 3, equipped with contiguous nozzle orifice 4. The slurry 5 is projected downwardly from the nozzle orifice 4 onto the face of the screen 1 at an initial velocity of about 5 feet per second to about 60 feet per second, preferably about 15 feet per second to about 40 feet per second. Underneath the screen 1, an enclosed space 6 defined by housing 7 and fines trough 8 is provided to retain the screen effluent. The screen effluent flows down to the bottom of enclosed space 6 into fines trough 8 and out of the screening apparatus through overflow pipe 9. The screen effluent which has passed through screen 1 contains substantially all of the fines in the slurry supply. The fiber slurry retained by screen 1 is washed downwardly over the face of screen 1, caught in trough 10 and flows from the screening apparatus through pipe 11.

A vacuum equivalent to about 0.5 inch to about 5 inches of water, preferably about 2 inches to about 4 inches of water, is applied to enclosed space 6 by pulling a vacuum through pipe 12. This vacuum results in the application of a like pressure differential through the screen 1. The pressure differential through screen 1 acts in cooperation with the initial velocity imparted to the fibrous slurry to achieve an increased throughput through the screen and increased selectivity in the screening operation. Multiple cleaning sprays 13, supplied with screen effluent through pipe 14, pump 15, pipe 16 and manifold 17, can be directed to the underside of screen 1 to inhibit any clogging of the screen openings. The sprays 13 can also be supplied with fresh water under pressure through manifold 17.

In FIGURE 2 there is illustrated another embodiment of the present screening apparatus. Screen 1 is a perforated metal plate with a thickness of about 0.006 inch to about 0.010 inch and has an open area of about 20%, although screens having open areas of about 10% to about 50% of their surface can be employed. Screens with greater open areas are preferred for increased capacity. The open area or total free area in screen 1 is made up of a multiplicity of holes, preferably relieved holes, that is holes having the form of truncated cones with the larger diameter at the effluent side of screen 1. The holes in screen 1 have minimum diameters of of about 0.005 inch to about 0.050 inch, preferably about 0.010 inch to about 0.040 inch, depending on the fiber recovery or classification anticipated for a particular screening apparatus. The diameters of the holes in screen 1 are measured at their smallest diameter, whether or not the holes are straight sided or relieved. In general, smaller diameter screen openings favor substantially complete fiber retention on a screen, while larger diameter screen openings favor classification of the fibers by size between the slurry fractions passed and retained by a screen.

In FIGURE 2, screen 1 is again disposed at an angle of 45 degrees with the vertical, although and as stated above, the angle of screen disposition can vary between about 0 degrees and about 60 degrees with the vertical while obtaining the present benefits in the screening operation. In FIGURE 2, as in FIGURE 1, the slurry containing fibers and fines is introduced under pressure through pipe 2 into chamber 3. Chamber 3 is equipped with a nozzle orifice 4 which directs the fiber slurry supply downwardly over screen 1 with the initial velocity stated above. Compressed air is introduced through pipe 18 into enclosed space 19, which closed space is defined by housing 20 and fiber trough 10. The compressed air provides the aforementioned pressure differential across screen 1. The fiber slurry 5 retained on screen 1 is washed downwardly, as before, is caught in trough 10 and flows from the screening apparatus through pipe 11. Cleaning sprays 13 can also be directed to the underside of screen 1 to further inhibit any clogging of the screen openings. The fines slurry passed through screen 1 is collected in enclosed space 6, defined by housing 7 and flows to trough 8. A pump 15 is provided to circulate a portion of the fines slurry through pipe 14, pipe 16 and manifold 17 to cleaning sprays 13. Any portion of the fines slurry which is not recirculated to cleaning sprays 13 overflows from trough 8 through pipe 9. Fresh water can also be employed for sprays 13.

In FIGURE 3, there is illustrated another embodiment of the present screening apparatus wherein screen 1 is in the form of a vertical cylinder, while chamber 3 and nozzle 4 assume annular shapes conforming and in relation thereto. The slurry containing fibers and fines is fed into chamber 3 through pipe 2. Chamber 3 is defined by hood 21 and bonnet 22. In FIGURE 3, the pressure differential across screen 1 is provided by introducing compressed air through pipe 18 into chamber 19 which is defined and enclosed by screen 1, bonnet 22 and fibers trough 10. The fiber slurry 5 retained on the inside of screen 1 runs down the interior of screen 1 and is collected in trough 10 for removal from the screening apparatus through pipe 11. The fines slurry passing through to the outside, or effluent side, of screen 1 runs down and is caught in annular trough 8. From annular trough 8, the fines slurry can be led through overflow pipe 9 to a suitable collection point for clarified process water or may first be pumped to the toroidal traveling manifold 17, which manifold 17 travels reciprocatively along the length of screen 1, to supply water for cleaning sprays 13.

Figure 4:
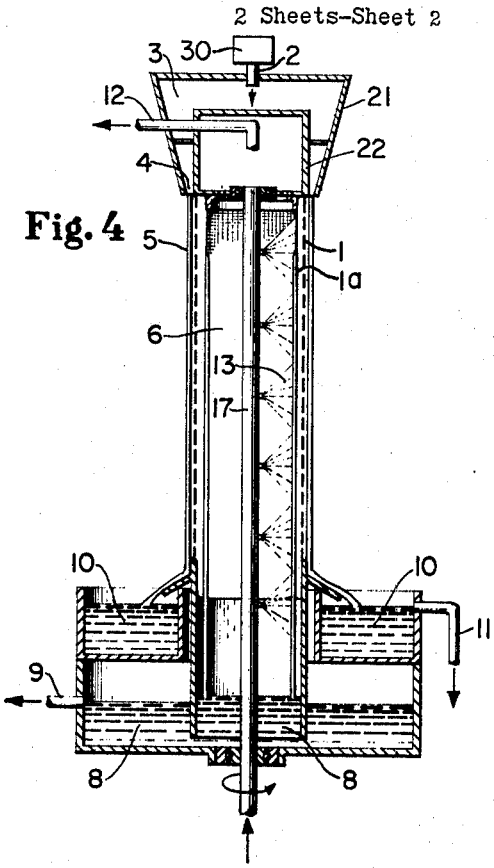
FIGURE 4 is an elevation cross section of another embodiment of apparatus suitable for use in practicing the invention, wherein a vertical cylindrical screen is employed together with vacuum induced pressure differential through said screen.

FIGURE 4 illustrates yet another embodiment of the present screening apparatus wherein screen 1, as in FIGURE 3, has the shape of a vertical cylinder. It should be noted that applicant, because of the differential pressure applied to screen 1, has found it advisable in using the more fragile screens, i.e., thinner screens with maximum free area, to back the screens with a coarser screen, mesh or perforated plate to provide mechanical support for screen 1. A perforated metal plate 1–a is employed in such a manner in the apparatus of FIGURE 4. In FIGURE 4 the fiber slurry supply is introduced through pipe 2 into chamber 3, which chamber 3 is defined by hood 21 and bonnet 22. Bonnet 22 also serves in part to define the nozzle 4.

In this embodiment of the screen apparatus illustrated in FIGURE 4, the pressure differential through screen 1 and screen 1-a is provided by applying through pipe 12 a vacuum to the chamber 6. Chamber 6 is defined by bonnet 22, screen 1 and 1-a and fines trough 8. The fiber slurry 5 retained by screen 1 runs down the exterior of screen 1 and is collected in fibers trough 10, while the fines slurry passing through to the interior of screen 1 and 1-a runs down and is collected in fines trough 8. A vertical pipe manifold 17 supporting cleaning sprays 13 is rotatably mounted interior to screen 1 and screen 1-a. Vertical pipe manifold 17 is adapted for rotation whereby cleaning sprays 13 can be directed around and to the interior surface of screen 1 and screen 1-a.

Figure 5:
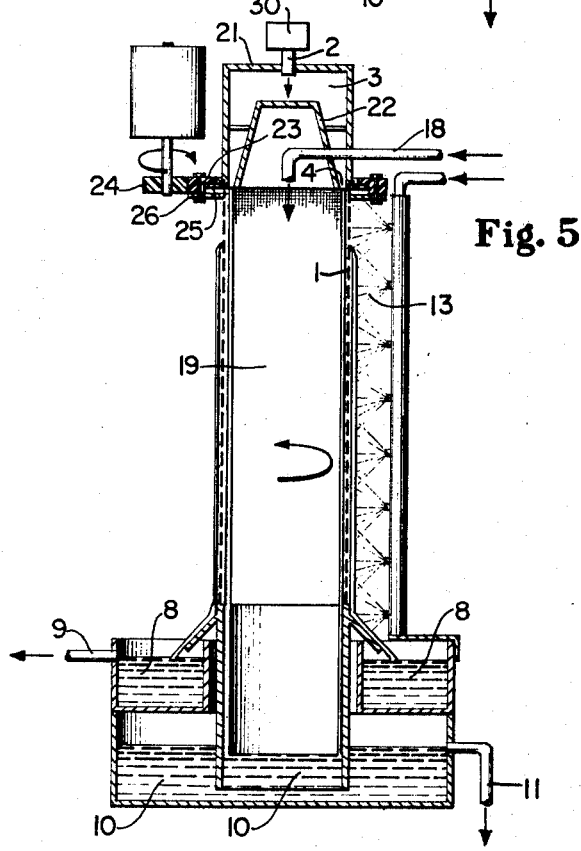
FIGURE 5 is a sectional view of yet another embodiment of the screening apparatus using a rotatable vertical cylindrical screen and employing a pressure induced pressure differential through the screen.
Figure 6:
FIGURE 6 is a sectional view of a single relieved hole in a perforated metal plate.

FIGURE 5 illustrates an embodiment of the screening apparatus of the present invention wherein screen 1 has the form of a vertical cylinder. Chamber 3 and nozzle 4 are disposed in an annular configuration at the upper end of screen 1. In FIGURE 5, the pressure differential through screen 1 is provided by introducing compressed air through pipe 18 into chamber 19, which chamber 19 is defined as illustrated in FIGURE 3. The fiber slurry retained by screen 1 runs down the interior of screen 1 and is collected in fiber trough 10 for removal from the screening apparatus by overflow through pipe 11. The fines slurry passing through screen 1 is caught in annular fines trough 8. As shown in FIGURE 3, the fines slurry can be led to a suitable collection point for clarified process water through overflow pipe 9, or it may be pumped to supply cleaning sprays 13 which are stationary and are directed against screen 1. In the embodiment of the present screening apparatus illustrated in FIGURE 5, screen 1 is turned about its axis by gear 23 and pinion 24 which slowly rotate screen 1 as it is supported by a slip ring 25 on the flange 26 of hood 21. The face of slip ring 25 in contact with flange 26 can be faced with a material exhibiting a low coefficient of friction, for example polyethylene, to facilitate rotation. In fact, in one preferred embodiment of the screening apparatus illustrated in FIGURE 5, gear 23, pinion 24, and slip ring 25 are all formed from polyethylene.

Other embodiments of the present principles of screen construction will suggest themselves to those skilled in the art, for example in the screen embodiments of FIGURES 3 and 4, screen 1 can be made to rotate past cleaning sprays mounted in a vertical cylindrical pipe.

In operation, the fibrous slurries to be screened are introduced into chamber 3 of any of the several illustrated embodiments of the invention, and, since the various functional parts of FIGURES 1-5 are numbered by like reference numbers, screen operation will be described with reference to all of the apparatus embodiments. The fibrous slurry is projected through nozzle orifice 4 and downwardly across the face of screen 1. The initial velocity of the downward projection can be adjusted by varying the pressure induced in chamber 3 which pressure operates to accelerate the fibrous slurry downwardly through nozzle orifice 4. It has been found that a minimum dimension of about 0.4 inch in nozzle 4 with a supply pressure of 5 p.s.i.g. on the entering fiber slurry will result in an initial slurry velocity of about 30 feet per second over the surface of screen 1.

The fibrous slurry flows downwardly over the face of screen 1, while in the screen embodiments illustrated in FIGURES 1 and 4 the fibrous slurry is urged through the screen by a vacuum applied through pipe 12 to chamber 6. In FIGURES 2, 3 and 5, there are illustrated apparatus embodiments in which compressed air is introduced through pipe 18 into chamber 19 to provide the required pressure differential through screen 1.

In each of the illustrated embodiment of the invention there are provided cleaning showers 13. The cleaning showers 13 can be stationary as illustrated in FIGURES 1 and 2 and 5 or be mounted rotatively or reciprocatively, as respectively shown in FIGURES 3 and 4, to direct spray water to all portions of the effluent side of screen 1. It is further noted that, while cleaning sprays 13 assist in the screening operation by tending to maintain the throughput of the screen 1, their continual use is not mandatory. Indeed, it may be desirable in the interest of water conservation to employ the cleaning sprays 13 in intermittent cycles as required to maintain flow through screen 1. In other instances, it will be found that the nature of the fibrous slurries to be screened and the fines to be washed therefrom make the operation of cleaning sprays 13 unnecessary.

The application of initial flow velocity and differential pressure to screen 1 will interact to affect the liquid throughput, the plugging tendency and the ability of a screen with given hole diameters and free area to separate or classify fibers and fines. It will be found, however, that within the limits stated above the optimum initial flow velocity across the surface of screen 1, the optimum fibrous slurry supply velocity and the optimum pressure differential will be easily determinable by adjustment of these factors after operations with a specific screen and fibrous slurry are initiated.

As an example of the results obtained by operation of the present screen apparatus, a screening apparatus as illustrated in FIGURE 5 wherein the vertical cylindrical perforated metal screen 1 was 14 inches in diameter and had a total area of 17 square feet was tested on a fibrous slurry, i.e. papermaking white water slurry. The vertical cylindrical metal screen 1 was 0.008 inch thick, and was perforated with 0.008 inch relieved holes in sufficient number so that the screen had a free area of 23%. When the vertical cylindrical screen 1 of this screen apparatus was turned at speed of 0.5 r.p.m. past the cleaning sprays 13, and the screening apparatus was fed 1170 gallons per minute of paper-making white water slurry containing approximately 0.1% combined fibers and fines, 97% of the fibers were recovered.

In this example of the present method of recovering and classifying the fibers and fines in a fibrous slurry the first step comprised projecting the fibrous slurry downwardly over the screen surface at an initial velocity of 30 feet per second, although, as previously stated, initial fibrous slurry velocities of about 5 feet per second to about 60 feet per second, preferably about 15 feet per second to about 40 feet per second, are useful in carrying out the method. The second step of the method comprised applying a pressure differential equivalent to about 3 inches of water through the screen, although, as previously stated, pressure differentials equivalent to about 0.5 inch of water to about 5 inches of water, preferably about 2 inches of water to about 4 inches of water, are beneficial. As the third step in the method, the portion of fibrous slurry containing the fines and passing through the screen and the portion of fibrous slurry containing the fibers and flowing downwardly over the screen surface were collected and maintained separate.

The screen did not blind or plug in continued operation, and the capacity of the screening apparatus in gallons of white water input per square foot while maintaining fiber recovery was demonstrated to be approximately 6 times that of a like perforated plate mounted as a conventional slanted screen, i.e. without benefit of nozzle supply and pressure differential operated in conjunction therewith. Similar results were obtained using the vertical cylindrical embodiments of the screen apparatus illustrated in FIGURES 3 and 4 and using the flat slanted screen embodiments of the screen apparatus illustrated in FIGURES 1 and 2.

While particular embodiments of the invention have been illustrated and described, it will be obvious to those skilled in the art that various changes and modifications can be made without departing from the spirit and scope of the invention, and it is intended to cover in the appended claims all such changes and modifications that are within the scope of this invention.

What is claimed as new is:

1. Apparatus for recovering and classifying the fibers and fines in a fibrous slurry comprising in combination a screen, a chamber at the top of said screen adapted to receive a fibrous slurry, means for introducing the fibrous slurry into said chamber under pressure, a nozzle orifice means contiguous with said chamber whereby said fibrous slurry is given an increased initial velocity downwardly over the surface of said screen, means for applying a pressure differential operating along a substantial length of and through said screen and the fibrous slurry received thereon to urge said slurry through the screen and means for the separate collection of the slurry passing through and the slurry retained by said screen, wherein the screen is inclined at an angle of 0 degrees to about 45 degress with the vertical and the screen is a perforated metal plate having a thickness of about 0.006 inch to about 0.010 inch and a multiplicity of holes with diameters of about 0.005 inch to about 0.050 inch.

2. Apparatus for recovering and classifying the fibers and fines in a fibrous slurry comprising in combination a screen, a chamber at the top of said screen adapted to receive a fibrous slurry, means for introducing the fibrous slurry into said chamber under pressure, a nozzle orifice means contiguous with said chamber whereby said fibrous slurry is given an increased initial velocity downwardly over the surface of said screen, means for applying a pressure differential operating along a substantial length of and through said screen and the fibrous slurry received thereon to urge said slurry through the screen and means for the separate collection of the slurry passing through and the slurry retained by said screen, wherein the screen is a vertical cylinder and said screen is a perforated metal plate having a thickness of about 0.006 inch to about 0.010 inch and a multiplicity of holes with diameters of about 0.010 inch to about 0.040 inch.

3. Apparatus for recovering and classifying the fibers and fines in a fibrous slurry comprising in combination a screen, a chamber at the top of said screen adapted to receive a fibrous slurry, means for introducing the fibrous slurry into said chamber under pressure, a nozzle orifice means contiguous with said chamber whereby said fibrous slurry is given an increased initial velocity downwardly over the surface of said screen, means for applying a pressure differential operating along a substantial length of and through said screen and the fibrous slurry received thereon to urge said slurry through the screen and means for the separate collection of the slurry passing through and the slurry retained by said screen, wherein the screen is a vertical cylinder and said screen is a perforated plate with a thickness of about 0.006 inch to about 0.010 inch, which perforated plate has a multiplicity of relieved holes with minimum diameters of about 0.010 inch to about 0.040 inch together with an open area of about 10% to about 50% of the area of said perforated plate.

4. A method for recovering and classifying the fibers and fines in a fibrous slurry, which method comprises the steps of (1) projecting said fibrous slurry downwardly over the surface of a screen inclined at an angle of less than 60 degrees with the vertical at an initial velocity of about 5 feet per second to about 60 feet per second, (2) applying a pressure differential independent of the slurry medium and equivalent to about 0.5 inch of water to about 5 inches of water to urge said slurry through said screen and (3) collecting and maintaining in separate portions the fibrous slurry passing through said screen and the fibrous slurry flowing downwardly over the screen surface.

5. The method for recovering and classifying the fibers and fines in a fibrous slurry of claim 4 wherein the initial velocity of the fibrous slurry in step (1) is about 15 feet per second to about 40 feet per second and the pressure differential applied through the screen in step (2) is equivalent to about 2 inches of water to about 4 inches of water.

References Cited

UNITED STATES PATENTS

| 1,220,232 | 3/1917 | Jackson | 209—397 |
| 2,866,553 | 12/1958 | Schmehl | 209—250 X |
| 3,121,660 | 2/1964 | Hall | 209—397 X |
| 3,231,087 | 1/1966 | Cusi | 209—250 |
| 1,951,017 | 3/1934 | Hatch | 162—55 |
| 3,221,886 | 12/1965 | Lamort | 209—380 XR |
| 3,363,769 | 1/1968 | Wilmot | 210—433 XR |

FOREIGN PATENTS

| 10,576 | 1885 | Great Britain. |
| 11,126 | 1906 | Great Britain. |

FRANK W. LUTTER, Primary Examiner

U.S. Cl. X.R.

209—273, 284, 304, 306, 380, 397; 210—433